(12) United States Patent
Kleinsasser

(10) Patent No.: US 8,216,031 B2
(45) Date of Patent: Jul. 10, 2012

(54) EUTHANASIA OF POULTRY

(75) Inventor: Jonathan Kleinsasser, Ste. Agathe (CA)

(73) Assignee: Crystal Spring Colony Farms Ltd., Ste. Agathe, Manitoba (CA)

( * ) Notice: Subject to any disclaimer, the term of this patent is extended or adjusted under 35 U.S.C. 154(b) by 378 days.

(21) Appl. No.: 12/579,525

(22) Filed: Oct. 15, 2009

(65) Prior Publication Data

US 2011/0092145 A1    Apr. 21, 2011

(51) Int. Cl.
*A22B 5/00* (2006.01)
(52) U.S. Cl. .......................................................... 452/52
(58) Field of Classification Search .................... 452/52, 452/54, 57, 60–62
See application file for complete search history.

(56) References Cited

U.S. PATENT DOCUMENTS

| | | | | |
|---|---|---|---|---|
| 3,686,713 A | * | 8/1972 | Lewis | 452/63 |
| 3,724,029 A | * | 4/1973 | Lewis | 452/52 |
| 3,724,032 A | * | 4/1973 | Harben, Jr. | 452/63 |
| 6,338,673 B2 | * | 1/2002 | Berry et al. | 452/58 |

* cited by examiner

*Primary Examiner* — Richard Price, Jr.
(74) *Attorney, Agent, or Firm* — Adrian D. Battison; Ade & Company Inc.

(57) ABSTRACT

Euthanasia of birds is carried out by locating a tool on the neck of the bird and crushing the neck between two co-operating members each having a front face for engaging the neck which is sufficiently blunt to prevent cutting of the skin of the neck during the crushing action so as to prevent escape of blood from the neck with the members being held separated at an end of the crushing action to prevent severing of the neck. The members can be driven together for example by hand pressure or on a frame by a foot lever or can be provided as a pair of counter-rotating wheels.

20 Claims, 5 Drawing Sheets

EUTHANASIA OF POULTRY

BACKGROUND OF THE INVENTION

In many situations it is necessary to euthanize domestic birds such as chickens, ducks, turkeys and geese at the end of their useful life or in the event of a health epidemic. One example where large numbers of birds are required to be euthanized is in regard to laying hens where a whole barn of hens are simultaneously euthanized at the end of their useful laying life, thus allowing the barn to be sanitized and a new batch brought in to start a new cycle.

As the carcases are of no commercial value, it is necessary to dispose of the high volume of carcases which can be done by grinding the carcases into a biodegradable mass which can be simply composted with suitable additives.

It is of course not humanely acceptable to enter the carcases into the grinding system while the birds are still conscious so that some system to kill or at least stun the birds before transportation to the grinding system is necessary.

Up to now, euthanasia has typically been carried out using a gas such as carbon dioxide to kill the birds in advance of removing the carcases from the cages. This is undesirable for many reasons including the risk to workers, the cost of materials, the necessity to have the birds located in a suitable situation where the gas can be concentrated upon them to cause their death. Typically this requires that the birds be removed from their environment into holding cages where the gas can be applied. They often then require further transportation to the disposal location. Another proposal shown in U.S. Pat. No. 7,435,166 (Benson) issued Oct. 14, 2008 uses a foam blanket to smother the birds.

The slaughter of birds for butchering is typically carried out by cutting the neck of the bird to allow bleeding to occur. Many prior art patents show devices for holding and locating the bird to allow the cutting action to occur. For example U.S. Pat. No. 3,490,092 (Harrison) issued Jul. 14, 1967 and U.S. Pat. No. 4,354,296 issued Oct. 19, 1982 both show an arrangement in which birds are carried in leg shackles to location where there is provided a pair of guide bars between which the neck of the bird passes as it is carried to cutting knives which sever the neck. Thus the death is caused by the cutting action and not by the bars which merely hold the neck.

The American Veterinary Medical Association (AVMA) describes euthanasia as "rapid loss of consciousness followed by cardiac or respiratory arrest and the ultimate loss of brain function." (2000 Report of the AVMA panel on euthanasia. JAVMA 218(5): 669-698.) The AVMA requires that the animal(s) to be euthanized experience minimal distress before being rendered unconscious. There are a number of currently accepted methods for euthanizing poultry include inhalation agents, non-penetrating captive bolt, cervical dislocation, percussive blow, decapitation, maceration, and electrocution. The methods cause death by (1) direct or indirect hypoxia, (2) direct depression of neurons and/or (3) physical disruption of brain activity. Extensive guidelines exist for euthanasia of poultry for processing prior to marketing. However, during emergencies such as a disease outbreak, there are fewer options. The 2000 Report of the AVMA Panel on Euthanasia, devotes only one paragraph on mass euthanasia and states "under unusual conditions, such as disease eradication and natural disasters, euthanasia options may be limited. In these situations, the most appropriate technique that minimizes human and animal health concerns must be used."

SUMMARY OF THE INVENTION

It is one object of the invention to provide a method and a device which can be used for euthanasia of poultry.

According to one aspect of the invention there is provided a method for euthanasia of birds comprising:

locating a tool on the neck of the bird;

the tool having two members each for engaging a respective opposite side of the neck;

crushing of the neck so as to sever the spinal cord by causing a squeezing movement by which a space between the members is reduced to effect the crushing action on the neck;

the members each having a front face for engaging the neck which is sufficiently blunt to prevent cutting of the skin of the neck during the crushing action so as to prevent escape of blood from the neck;

the members being held separated at an end of the crushing action to prevent severing of the neck.

In order to provide the action which avoids cutting and severing the neck, preferably the members each provide a front face defined by a surface which is smoothly curved with a radius of curvature around a respective axis with the axes generally parallel and generally transverse to the direction of squeezing movement. Preferably the members have a radius of curvature greater than $1/16$ inch. For example rods of $3/16$ diameter can be used without causing the unacceptable cutting action. Preferably the members are separated at the end of the crushing action by a distance greater than $1/16$ inch and preferably in the range $1/16$ to $1/4$ inch.

Preferably the radius of curvature extends fully along the operating length of the members so as to provide no areas which can engage the neck which are sharp.

In one suitable example, the members are each formed by a portion of a cylindrical rod.

Preferably the members are shaped to define an open mouth into which the neck can be inserted in a direction at right angles to the direction of squeezing movement. This can be done by forming the rods so that they diverge outside the crushing area to form a mouth.

In one preferred arrangement, one or both of the members is moved in the squeezing direction so that the members are squeezed together to cause the crushing action. In this arrangement, preferably the members are spring biased into an open position.

Where the members are moved together, this can be done by mounting each of the members on a respective lever with the levers engaged by the hand of a worker so as to apply the squeezing action by manual force with the levers connected at a center pivot point in a scissors action.

Alternatively the members can be moved in the squeezing action by mounting one of the members on a fixed frame and by moving the other of the members relative to the fixed frame such as by mounting the other of the members on a lever actuated by a foot pedal. The fame can rest on the ground or be arranged to mount on a cage side or be otherwise suitable mounted in fixed position. The foot provides suitable motive power freeing the two hands to hold the bird. However other motive action can be provided by other means including a motor.

In an alternative arrangement, the crushing action is caused by the squeezing movement in which the neck is located between counter-rotating wheels so that he neck is drawn into a throat between the wheels and is crushed at a point of closest approach of the wheels.

It will be appreciated therefore that different mechanical constructions can be provided to activate the squeezing action with the key point being that the members which come together in the squeezing or crushing action do not cut or sever in view of their shape and location at the end of the crushing action. It has been found that this crushing action kills the bird while leaving the neck intact and thus avoiding the unpleasant and unhygienic escape of blood which will require difficult cleanup.

The whole idea behind this is to kill the bird quickly without having blood all over the place. With the portable tool the worker can reach into the cage and snap the necks, let the dead or dying birds jump around under the typical nervous action while remaining in the cage for about 20 seconds and remove them when the nervous reaction is complete into a container to haul them out of the barn.

According to a second aspect, the invention also provides an apparatus for euthanasia of birds comprising:

a tool for locating on the neck of the bird;

the tool having two members each for engaging a respective opposite side of the neck;

elements for causing a squeezing movement by which a space between the members is reduced to effect the crushing action on the neck;

the members each having a front face for engaging the neck which is sufficiently blunt to prevent cutting of the skin of the neck during the crushing action so as to prevent escape of blood from the neck;

the members being held separated at an end of the crushing action to prevent severing of the neck.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
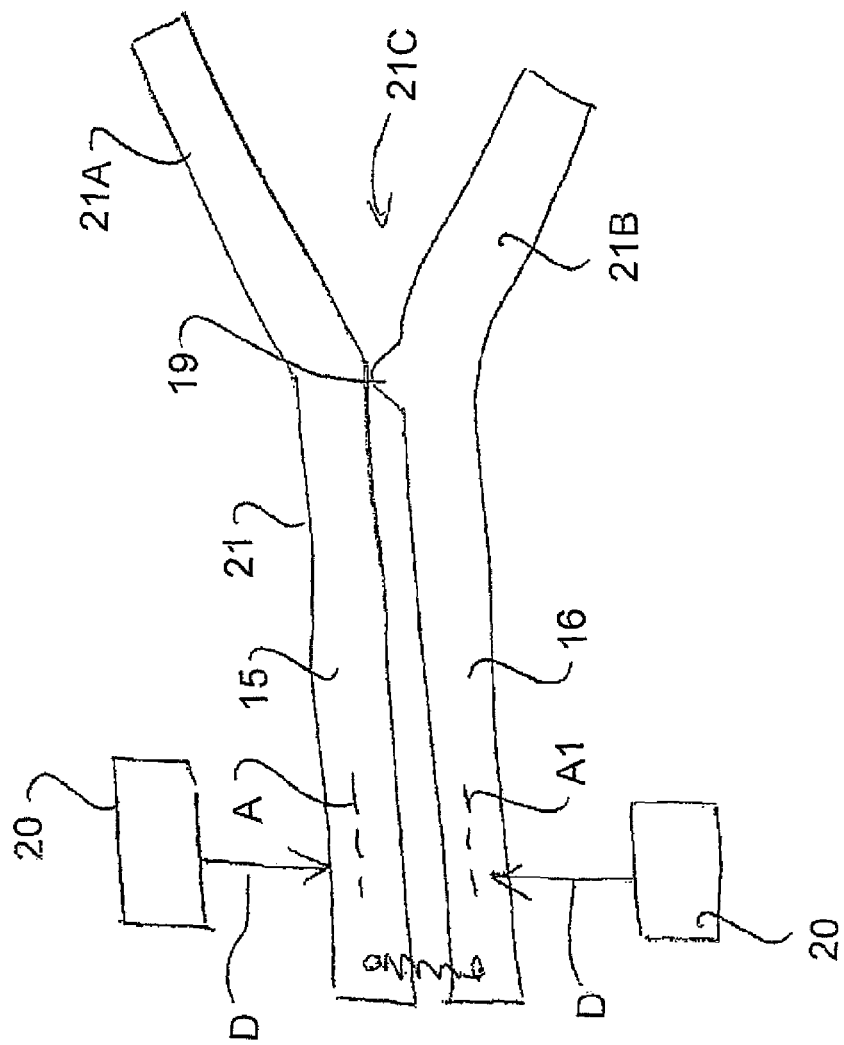
FIG. 1 is a schematic side elevational view of an apparatus according to the present invention showing only the operating members.
Figure 2:
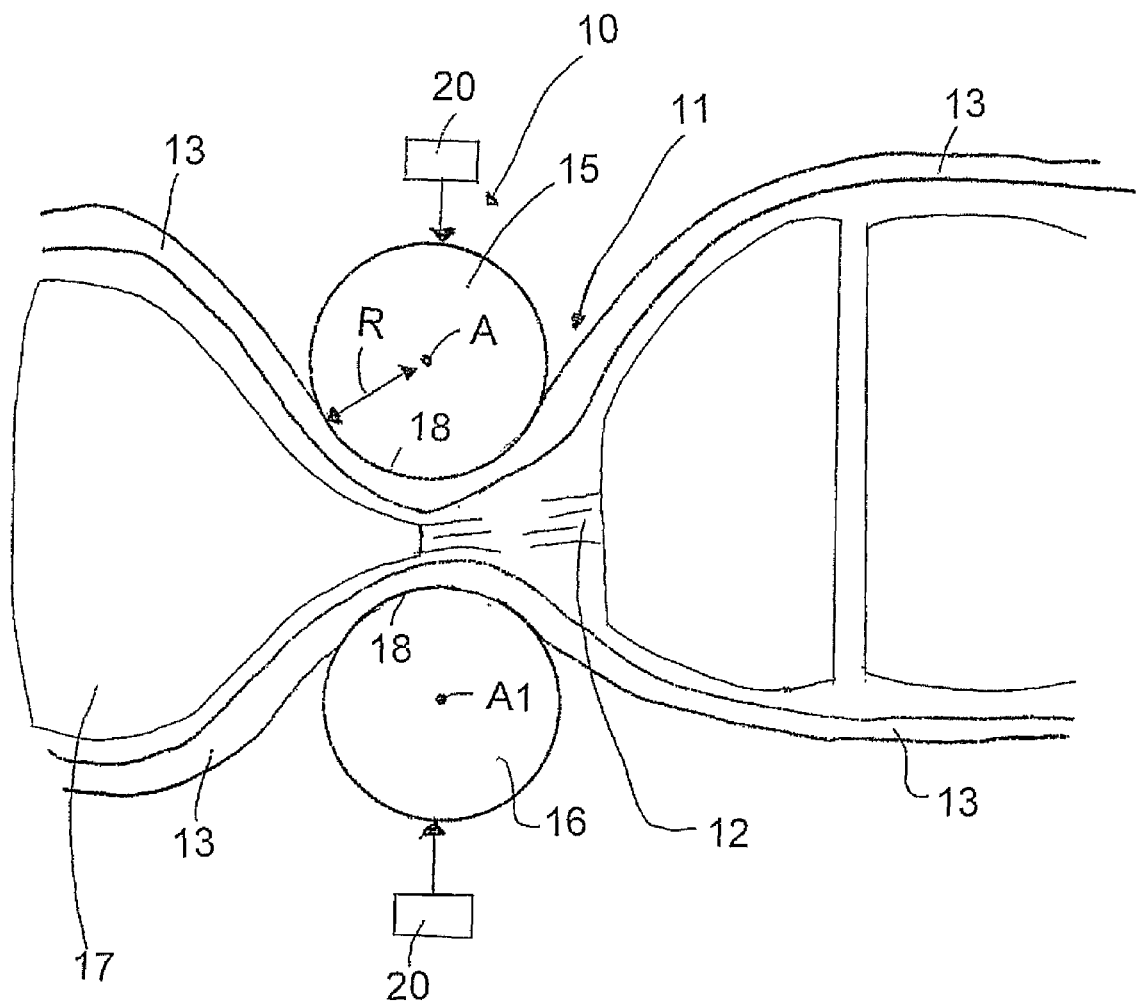
FIG. 2 is a cross sectional view of the members of FIG. 1 showing the crushing action on a neck of a bird in the method of euthanasia.

The method for euthanasia of birds as shown in the FIGS. 1 and 2 of the drawings includes locating a tool 10 on the neck 11 of the bird to effect crushing of the neck 11 so as to sever the spinal cord 12 by causing a squeezing movement while acting to prevent cutting of the skin 13 of the neck during the crushing action so as to prevent escape of blood from the neck and while acting to prevent severing of the neck.

Thus the intention is to kill the bird quickly while the birds remain located in their cages without releasing blood all over the place by cutting arteries or by decapitating the bird. With the portable tool the worker can reach into the cage where the birds are housed and can snap the necks. The bird can be held in the cage while the neck is broken and the tool operated manually or the bird can be pulled out of the cage temporarily and operated upon by a tool located outside the cage and returned to the cage after the neck is snapped.

The worker can then let the dead or dying birds jump around under the typical nervous action while remaining in the cage for about 20 seconds and then remove them when the nervous reaction is complete directly into a container to haul the carcasses out of the barn for disposal.

The tool has two members 15, 16 each for engaging a respective opposite side of the neck for effecting the crushing of the neck so as to sever the spinal cord 12 by causing a squeezing movement by which a space between the members is reduced to effect the crushing action on the neck. The severing action can be effected by crushing the bones 17 of the neck or by forcing the bones apart, or both, depending on where the members engage the neck.

The members each have a front face 18 for engaging the neck which is sufficiently blunt to prevent cutting of the skin of the neck during the crushing action so as to prevent escape of blood from the neck. Thus the front face 18 is defined by a surface which is smoothly curved with a radius of curvature R around a respective axis A greater than ⅛ inch. The curvature is arranged along the full length so as to provide no areas which can engage the neck which are sharp. This curvature prevents the cutting of the skin.

The axes A and A1 are generally parallel to each other and generally transverse or at right angles to the direction D of squeezing movement.

The members are held at least partly separated at an end of the crushing action by a suitable stop 19 to prevent severing of the neck. The stop can be located on any of the components including the members themselves or any drive member schematically indicated at 20. If the stop is mounted in the members it is located preferably at one end so as to be at a position which does not interfere with the severing action for example at one end of the member as shown in FIG. 1. The members are separated by the stop 20 at the end of the crushing action by a distance in the range 1/16 to ¼ inch so that the skin is not severed and so that the whole neck is not cut away or pinched off.

In the embodiment shown, the members are each formed by a portion of a cylindrical rod 21 which is bent at one end 21A, 21B to define an open mouth 21C into which the neck can be inserted in a direction at right angles to the direction of squeezing movement.

Figure 3:
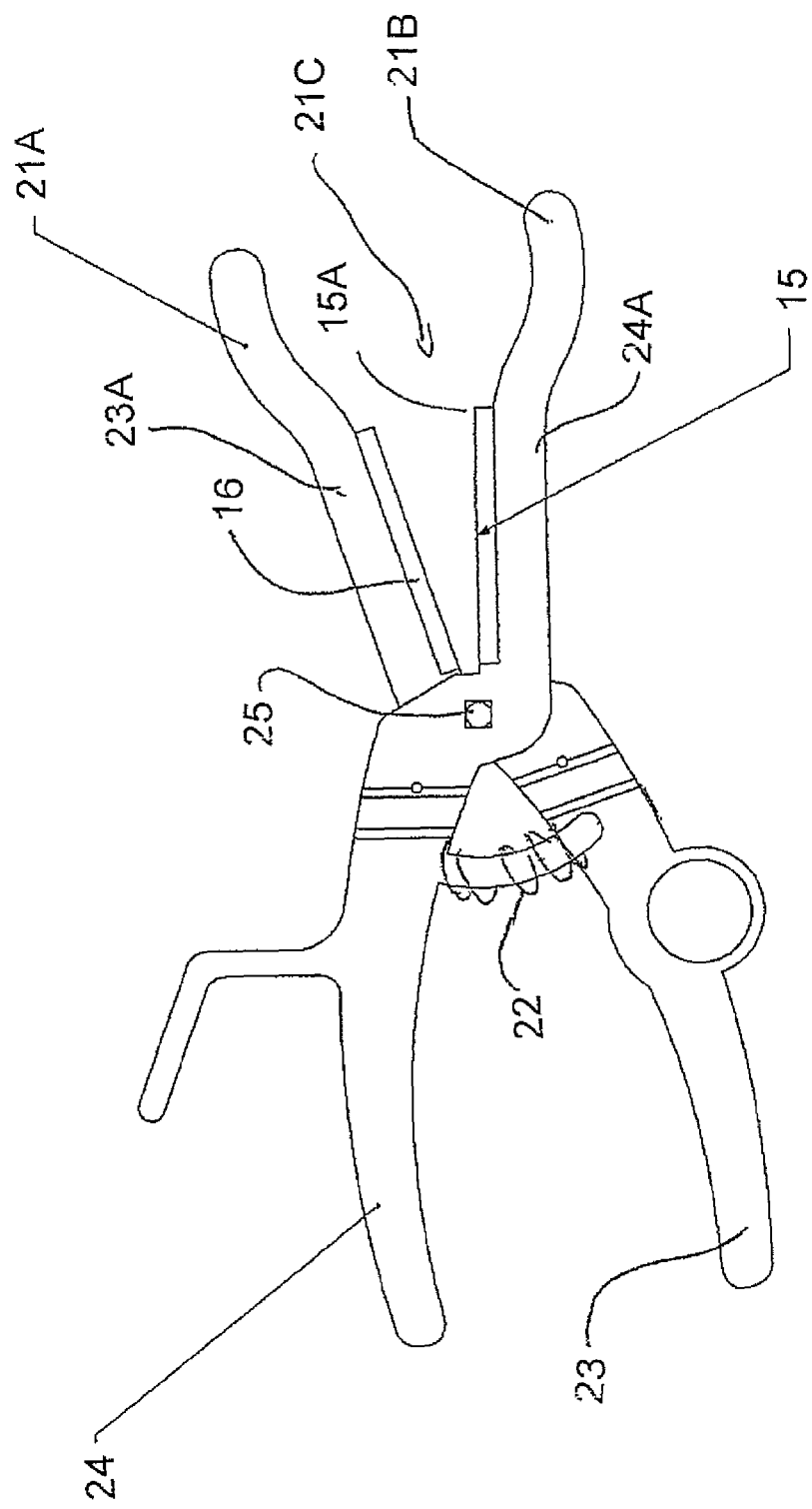
FIG. 3 is a side elevational view of a first tool for operating the members of FIGS. 1 and 2.

In the embodiment of FIG. 3 the members 15, 16 are squeezed together to cause the crushing action by movement of one or both of the members in the squeezing direction. In order to assist in holding the members apart to allow entry of the neck, the members are spring biased into an open position by a spring 22. The members are moved in the squeezing action by mounting each of the members on a respective lever 23, 24 connected at a center pivot point 25 with the levers engaged by the hand of a worker in a scissors action so as to apply the squeezing action by manual force. In this case there is no specific stop member acting to halt the movement of the members but instead the members have their axes which are slightly tilted relative to one another so that the members touch at the outer end 15A with the remainder of the members 15 and 16 being held spaced by the sight angle therebetween. This ensures that the pinching action on the neck does not cause the undesired severing since, even if the neck is pinched by a part of the members including the outer ends, the pinching length where the members nip or meet is insufficient to effect the severing action. Also it will be appreciated that the amount of force which can be applied manually is relatively small so that there is less risk of pinching off. Also the greatest mechanical advantage is located closer to the pivot point 25 so that the user will prefer to locate the neck to be crushed adjacent the pivot point 25 rather than at the outer end 15A. The throat 21C is formed by portions 21A and 21B of the lever portions 23A and 24A which extend beyond the members 1 and 16 rather than by the members themselves.

Figure 4:
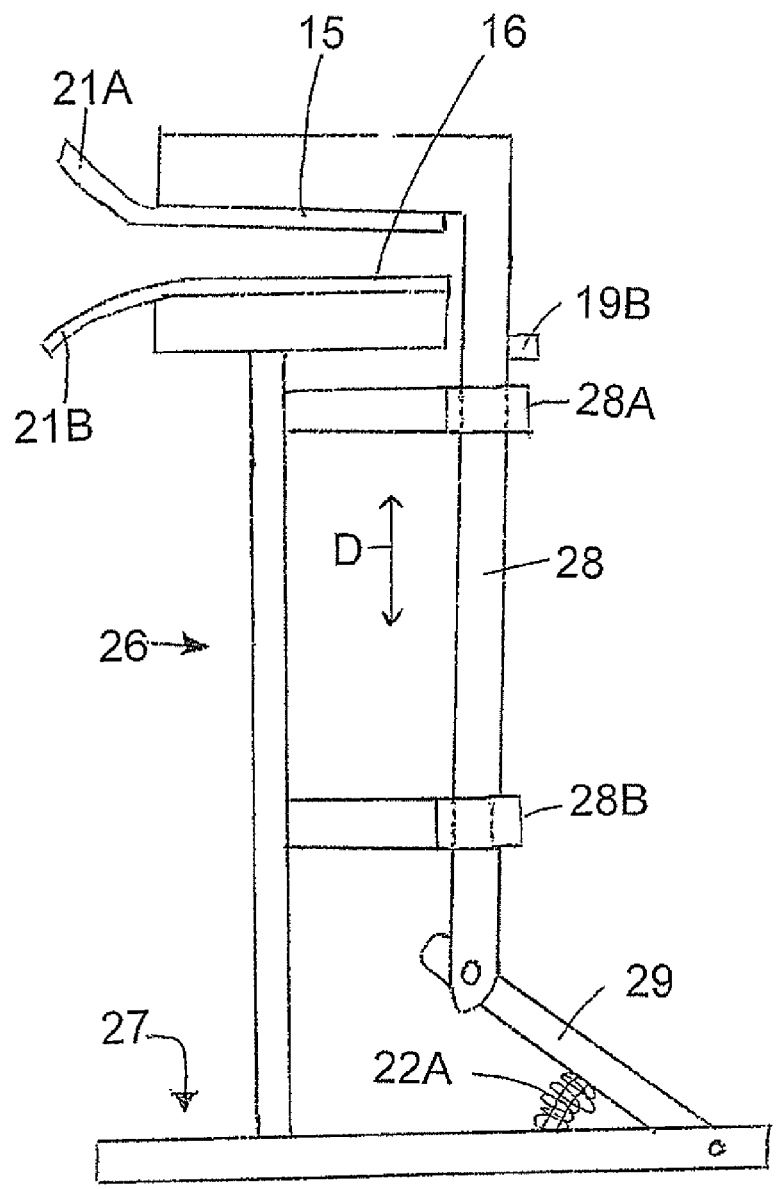
FIG. 4 is a side elevational view of a second tool for operating the members of FIGS. 1 and 2.

In the embodiment of FIG. 4, the members 15, 16 are moved in the squeezing action by mounting one of the members 16 on a fixed frame 26 mounted on a stand 27 carried on the ground or on a cage wall and by moving the other of the members 15 relative to the fixed frame. This movement can be effected by many different arrangements but in the example shown, the member 15 is moved in the squeezing action by mounting on a lever or rod 28 actuated by a foot pedal. The rod 28 is guided in linear movement D by slide guides 28A, 28B attached to the frame 26. The foot pedal is biased to the open position of the members by a spring 22A.

In view of the fact that relatively high forces can be applied using a foot pedal, it is highly desirable to provide an effective stop 19B in the system at a suitable location on one of the elements such as the rod 28 to ensure that the spacing between the members 15 and 16 is properly limited to the allowed minimum.

Figure 5:
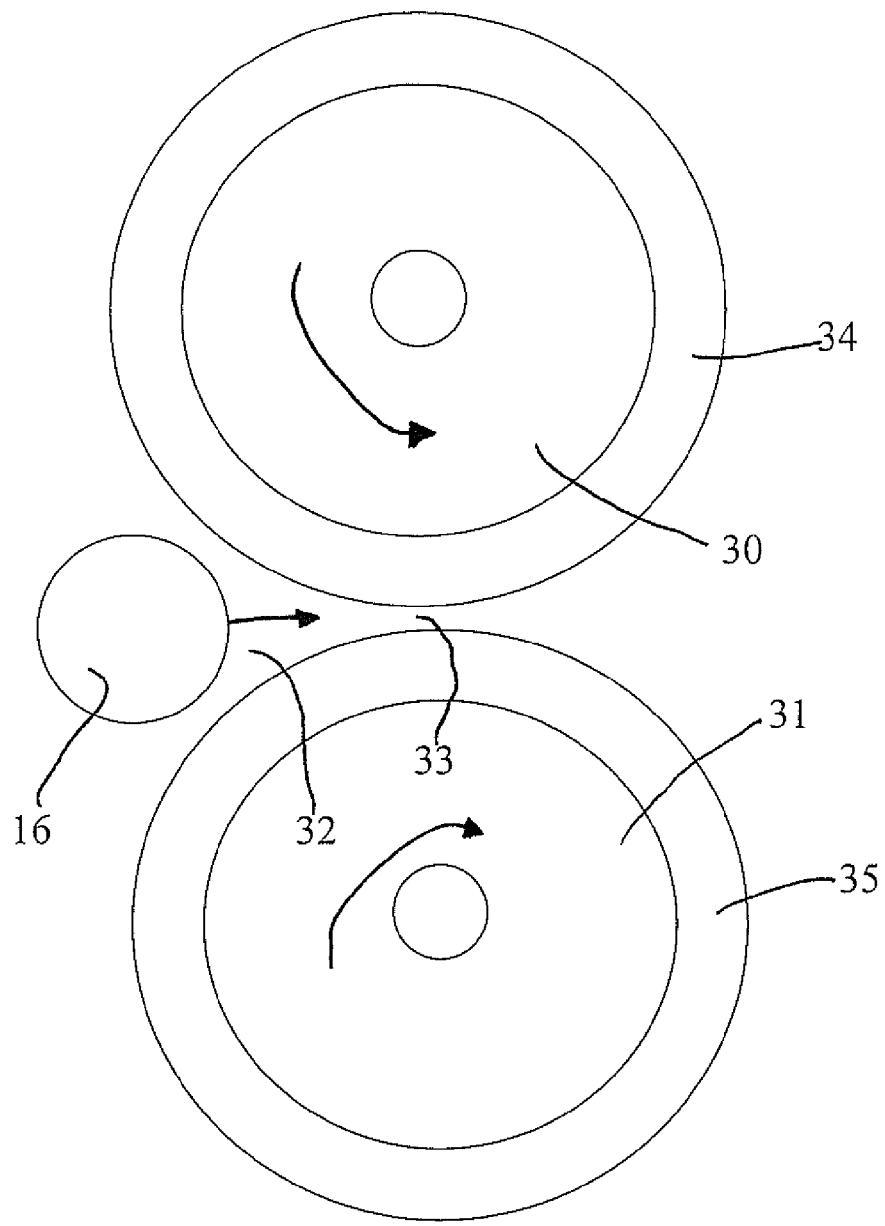
FIG. 5 is a side elevational view of a third tool for operating the members of FIGS. 1 and 2.

In the embodiment of FIG. 5, the crushing action on the neck 16 is caused by the squeezing movement in which the neck 16 is located between and drawn into the space between counter-rotating wheels 30 and 31 so that he neck is drawn into a throat 32 between the wheels and is crushed at a point 33 of closest approach of the wheels. Each of the wheels carries a rod 34, 35 around its periphery to define the curved surface 18 to prevent cutting as described above. The closest space 33 is held at the required spacing to effect the crushing action without severing as described above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for euthanasia of birds comprising:
    locating a tool on the neck of the bird;
    the tool having two members each for engaging a respective opposite side of the neck;
    crushing of the neck so as to sever the spinal cord by causing a squeezing movement by which a space between the members is reduced to effect the crushing action on the neck;
    the members each having a front face for engaging the neck which is sufficiently blunt to prevent cutting of the skin of the neck during the crushing action so as to prevent escape of blood from the neck;
    the members being held separated at an end of the crushing action to prevent severing of the neck.

2. The method according to claim 1 wherein the members each provide a front face defined by a surface which is smoothly curved with a radius of curvature around a respective axis with the axes generally parallel and generally transverse to the direction of squeezing movement.

3. The method according to claim 2 wherein the members have a radius of curvature greater than 1/16 inch.

4. The method according to claim 1 wherein the members are separated at the end of the crushing action by a distance in the range 1/16 to 1/4 inch.

5. The method according to claim 1 wherein the members have a radius of curvature along their length so as to provide no areas which can engage the neck which are sharp.

6. The method according to claim 1 wherein the members are each formed by a portion of a cylindrical rod.

7. The method according to claim 1 wherein the members are shaped to define an open mouth into which the neck can be inserted in a direction at right angles to the direction of squeezing movement.

8. The method according to claim 1 wherein the members are squeezed together to cause the crushing action by movement of at least one of the members in the squeezing direction.

9. The method according to claim 8 wherein the members are spring biased into an open position.

10. The method according to claim 8 wherein the members are moved in the squeezing action by mounting each of the members on a respective with the levers engaged by the hand of a worker so as to apply the squeezing action by manual force.

11. The method according to claim 10 wherein the levers are connected at a center pivot point.

12. The method according to claim 8 wherein the members are moved in the squeezing action by mounting one of the members on a fixed frame and by moving the other of the members relative to the fixed frame.

13. The method according to claim 12 wherein the other of the members is moved in the squeezing action by mounting the other of the members on a lever actuated by a foot pedal.

14. The method according to claim 1 wherein crushing action is caused by the squeezing movement in which the neck is located between counter-rotating wheels so that he neck is drawn into a throat between the wheels and is crushed at a point of closest approach of the wheels.

15. An apparatus for euthanasia of birds comprising:
    a tool for locating on the neck of the bird;
    the tool having two members each for engaging a respective opposite side of the neck;
    elements for causing a squeezing movement by which a space between the members is reduced to effect the crushing action on the neck;
    the members each having a front face for engaging the neck which is sufficiently blunt to prevent cutting of the skin of the neck during the crushing action so as to prevent escape of blood from the neck;
    the members being held separated at an end of the crushing action to prevent severing of the neck.

16. The apparatus according to claim 15 wherein the members each provide a front face defined by a surface which is smoothly curved with a radius of curvature around a respective axis with the axes generally parallel and generally transverse to the direction of squeezing movement.

17. The apparatus according to claim 16 wherein the members have a radius of curvature greater than 1/8 inch.

18. The apparatus according to claim 15 wherein the members are separated at the end of the crushing action by a distance in the range 1/16 to 1/4 inch.

19. The apparatus according to claim 15 wherein the members have a radius of curvature along their length so as to provide no areas which can engage the neck which are sharp.

20. The apparatus according to claim 15 wherein the members are each formed by a portion of a cylindrical rod.

* * * * *